US011713051B2

(12) United States Patent
Shimomura et al.

(10) Patent No.: US 11,713,051 B2
(45) Date of Patent: Aug. 1, 2023

(54) VEHICLE DRIVE-ASSIST APPARATUS (71) Applicant: SUBARU CORPORATION, Tokyo (JP)

(72) Inventors: Yuki Shimomura, Tokyo (JP); Masayuki Sato, Tokyo (JP); Satoshi Terayama, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 57 days.

(21) Appl. No.: 17/328,326

(22) Filed: May 24, 2021

(65) Prior Publication Data

US 2021/0387633 A1  Dec. 16, 2021

(30) Foreign Application Priority Data

Jun. 10, 2020 (JP) ................. 2020-100837

(51) Int. Cl.
*B60W 50/08* (2020.01)
*B60W 40/08* (2012.01)
*B60W 40/04* (2006.01)
*G06V 20/56* (2022.01)

(52) U.S. Cl.
CPC .......... *B60W 50/085* (2013.01); *B60W 40/04* (2013.01); *B60W 40/08* (2013.01); *G06V 20/56* (2022.01); *B60W 2540/10* (2013.01); *B60W 2552/00* (2020.02)

(58) Field of Classification Search
CPC .... B60W 50/085; B60W 40/04; B60W 40/08; B60W 2552/00; B60W 2540/10; G06V 20/56
See application file for complete search history.

(56) References Cited

U.S. PATENT DOCUMENTS 8,103,439 B2 * 1/2012 Onishi ................. G09B 29/106
701/457
9,043,086 B1 * 5/2015 Gauthier ................. G05G 1/40
74/513

(Continued)

FOREIGN PATENT DOCUMENTS

JP 2013-217269 A 10/2013

*Primary Examiner* — Hussein Elchanti
(74) *Attorney, Agent, or Firm* — McDermott Will & Emery LLP (57) ABSTRACT

A vehicle drive-assist apparatus includes a traveling environment information acquisition unit, an output setting unit, an urban-region traveling determination unit, and an output suppression control processor. The traveling environment information acquisition unit is configured to acquire traveling environment information of a vehicle. The output setting unit is configured to set output of a driving source of the vehicle on the basis of an accelerator-pedal pushing amount of the vehicle. The urban-region traveling determination unit is configured to determine whether the vehicle is traveling in an urban region, on the basis of the traveling environment information. The output suppression control processor is configured to set an output characteristic of the driving source to a suppression characteristic in a case of traveling in the urban region. The output setting unit is configured to set the output of the driving source on the basis of the set suppression characteristic.

9 Claims, 4 Drawing Sheets (56) References Cited

U.S. PATENT DOCUMENTS

| | | | | |
|---|---|---|---|---|
| 2004/0187629 A1* | 9/2004 | Koo | ............................ | B60T 7/06 |
| | | | | 74/560 |
| 2010/0256854 A1* | 10/2010 | Feder | .................... | B60W 50/16 |
| | | | | 701/31.4 |
| 2012/0322616 A1* | 12/2012 | Fukui | .................... | B60W 50/10 |
| | | | | 477/94 |
| 2013/0041564 A1* | 2/2013 | Doi | ..................... | B60W 50/087 |
| | | | | 701/70 |
| 2014/0067203 A1* | 3/2014 | Kim | ...................... | B60W 50/16 |
| | | | | 701/36 |
| 2015/0012198 A1* | 1/2015 | Kumazawa | ................ | B60T 7/22 |
| | | | | 701/1 |
| 2016/0004271 A1* | 1/2016 | Gregory | ................. | B60W 20/10 |
| | | | | 74/513 |
| 2017/0030270 A1* | 2/2017 | Tipton | ................... | F02D 11/105 |
| 2017/0349185 A1* | 12/2017 | McNew | ................. | B60W 30/16 |
| 2018/0156329 A1* | 6/2018 | Hose | ............. | B60W 30/18118 |
| 2018/0252178 A1* | 9/2018 | Payne | ................... | B60W 20/00 |
| 2018/0362076 A1* | 12/2018 | Rowell | .................... | B62D 6/04 |
| 2019/0225238 A1* | 7/2019 | Murakami | ........... | B60W 40/109 |
| 2019/0389535 A1* | 12/2019 | Moening | ................... | B62M 6/50 |
| 2020/0216068 A1* | 7/2020 | Tashiro | ............... | B60W 30/146 |
| 2020/0307592 A1* | 10/2020 | Kumano | ................. | B60W 10/04 |
| 2021/0001856 A1* | 1/2021 | Miura | ................. | B60T 7/12 |
| 2021/0061274 A1* | 3/2021 | Escalante | ............. | B60W 30/162 |
| 2021/0278872 A1* | 9/2021 | Battlogg | ................... | G05G 5/03 |
| 2022/0176981 A1* | 6/2022 | Kuehner | .............. | B60K 26/021 |

* cited by examiner

VEHICLE DRIVE-ASSIST APPARATUS

CROSS-REFERENCE TO RELATED APPLICATIONS

The present application claims priority from Japanese Patent Application No. 2020-100837 filed on Jun. 10, 2020, the entire contents of which are hereby incorporated by reference.

BACKGROUND

The technology relates to a vehicle drive-assist apparatus that assists driving of a vehicle.

When a driver driving a vehicle tries to push a brake pedal to perform immediate deceleration of the traveling vehicle, it is difficult for the driver to visually recognize an accelerator pedal and the brake pedal. Therefore, the driver sometimes mistakes the accelerator pedal for the brake pedal and keeps pushing the accelerator pedal without noticing such a mistake.

To address this, a pushing-mistake prevention device that is to be separately provided along with the accelerator pedal, and a one-pedal pushing-mistake prevention device have been commercially available already. The one-pedal pushing-mistake prevention device integrates the accelerator pedal and the brake pedal and is installable in place of the existing accelerator pedal and the existing brake pedal. However, additionally installing such a pushing-mistake prevention device can be an economic burden on a user. Further, the one-pedal pushing-mistake prevention device may require a certain period for getting used to the operation thereof.

For such a reason, for example, Japanese Unexamined Patent Application Publication (JP-A) No. 2013-217269 discloses a technique of limiting acceleration when the accelerator pedal is pushed in a case where the traveling speed of the vehicle is a predetermined speed or lower and where the amount of operation performed on the accelerator pedal is a predetermined amount or more.

SUMMARY

An aspect of the technology provides a vehicle drive-assist apparatus that includes a traveling environment information acquisition unit, an output setting unit, an urban-region traveling determination unit, and an output suppression control processor. The traveling environment information acquisition unit is configured to acquire traveling environment information that is information of an environment in which a vehicle travels. The output setting unit is configured to set output of a driving source of the vehicle on the basis of an accelerator-pedal pushing amount that is an amount by which an accelerator pedal of the vehicle is pushed. The urban-region traveling determination unit is configured to determine whether the vehicle is traveling in an urban region, on the basis of the traveling environment information acquired by the traveling environment information acquisition unit. The output suppression control processor is configured to set an output characteristic of the driving source to a suppression characteristic in a case where the urban-region traveling determination unit determines that the vehicle is traveling in the urban region. The suppression characteristic is a characteristic in which the output of the driving source is suppressed with respect to the accelerator-pedal pushing amount. The output setting unit is configured to set the output of the driving source on the basis of the suppression characteristic set by the output suppression control processor, in a case where the urban-region traveling determination unit determines that the vehicle is traveling in the urban region.

An aspect of the technology provides a vehicle drive-assist apparatus that includes a traveling environment information acquisition unit and circuitry. The traveling environment information acquisition unit is configured to acquire traveling environment information that is information of an environment in which a vehicle travels. The circuitry is configured to set output of a driving source of the vehicle on the basis of an accelerator-pedal pushing amount that is an amount by which an accelerator pedal of the vehicle is pushed. The circuitry is configured to determine whether the vehicle is traveling in an urban region, on the basis of the acquired traveling environment information. The circuitry is configured to set an output characteristic of the driving source to a suppression characteristic in a case where the vehicle is determined as being traveling in the urban region. The suppression characteristic is a characteristic in which the output of the driving source is suppressed with respect to the accelerator-pedal pushing amount. The circuitry is configured to set the output of the driving source on the basis of the set suppression characteristic, in a case where the vehicle is determined as being traveling in the urban region.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

According to a technique disclosed in JP-A No. 2013-217269, in a case where a traveling speed of a vehicle is a predetermined speed or lower and where an amount of operation performed on an accelerator pedal is a predetermined amount or more, it is determined that a pushing mistake is occurring, and acceleration is uniformly limited. Accordingly, even in a case where a driver wants to perform acceleration and intentionally pushes the accelerator pedal, the acceleration may be limited, giving a sense of strangeness to the driver.

Generally, the driver who mistakenly pushes the accelerator pedal instead of the brake pedal is able to notice such a pushing mistake at once and respond appropriately if a traveling environment is not in a tense situation. However, in a case where the driver mistakenly pushes the accelerator pedal instead of the brake pedal when the traveling environment is in a tense situation or in a case where such a pushing mistake makes the traveling environment to be in a tense situation, it is difficult for the driver to respond calmly. Therefore, it may be necessary to actively intervene in a control, for example, by suppressing acceleration.

Accordingly, it may be favorable to understand a traveling environment in which the driver easily gets in a tense situation, and to thereby suppress sudden acceleration resulting from mistakenly pushing the accelerator pedal instead of the brake pedal only in a traveling situation in which such suppression of acceleration is favorable.

It is desirable to provide a vehicle drive-assist apparatus that allows for reduction of a sense of strangeness given to a driver.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description. The reference numeral 1 in FIG. 1 denotes a drive-assist apparatus according to an example embodiment of the technology. The drive-assist apparatus 1 may be mounted on a vehicle M illustrated in FIGS. 5 and 6. The drive-assist apparatus 1 may include a vehicle position estimation unit 11, a camera unit 21, and a traveling control unit 31.

Figure 1:
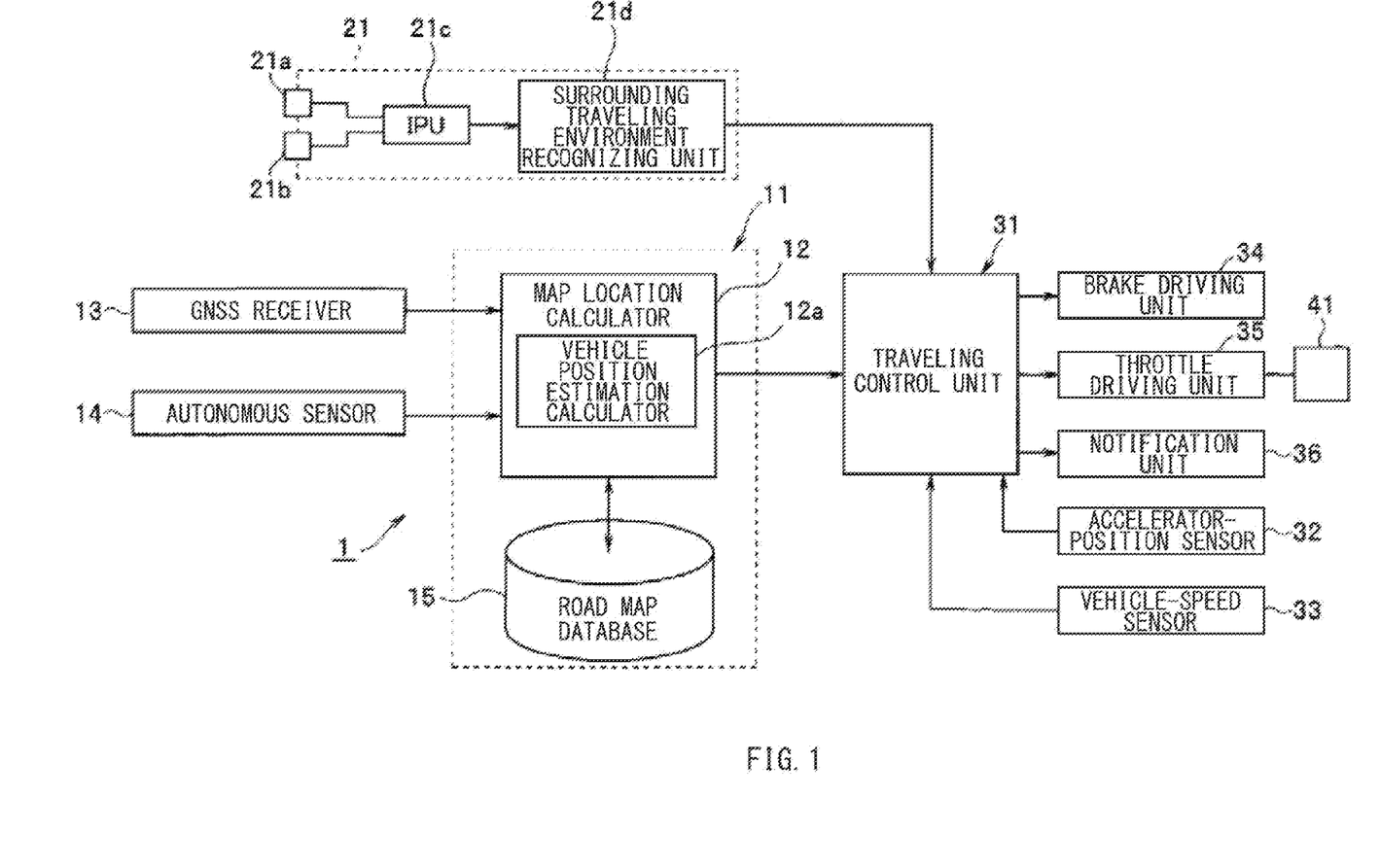
FIG. 1 is a diagram illustrating an example of a schematic configuration of a drive-assist apparatus according to an example embodiment of the technology.

The vehicle position estimation unit 11 may include a map location calculator 12 and a road map database 15. In one embodiment, the road map database 15 may serve as a "road map storage unit". The map location calculator 12, a later-described surrounding traveling environment recognizing unit 21d, and the traveling control unit 31 may include a known integrated circuit provided with devices including, without limitation, a control processing unit (CPU), a random-access memory (RAM), a read-only memory (ROM), and a nonvolatile storage, and peripheral devices thereof. Stored in advance in the ROM may be a program to be executed by the CPU, fixed data including, without limitation, a table and a map, and the like.

Coupled to an input side of the map location calculator 12 may be a global navigation satellite system (GNSS) receiver 13 and an autonomous sensor 14. The GNSS receiver 13 may receive positioning signals transmitted from respective positioning satellites. The autonomous sensor 14 may include, without limitation, a vehicle-speed sensor, a yaw-rate sensor, and a longitudinal-acceleration sensor.

The map location calculator 12 may include a vehicle position estimation calculator 12a. In one embodiment, the vehicle position estimation calculator 12a may serve as an "vehicle position estimation unit". The vehicle position estimation calculator 12a may estimate position coordinates (latitude, longitude, and altitude) of a present position of the vehicle M. That is, in a case where the GNSS receiver 13 is allowed to receive positioning signals, the vehicle position estimation calculator 12a may estimate the vehicle position on the basis of the received positioning signals. In an environment, such as an in-tunnel traveling environment, with low sensitivity for receiving the positional signals from the GNSS satellites in which effective reception of the positioning signals is difficult, the vehicle position estimation calculator 12a may perform localization from a movement distance and a traveling direction. The vehicle position estimation calculator 12a may perform such localization on the basis of factors including, without limitation, a vehicle speed detected by the vehicle-speed sensor, a yaw rate detected by the yaw-rate sensor, and longitudinal acceleration detected by the longitudinal-acceleration sensor.

The road map database 15 may be amass storage medium such as a hard disk drive (HDD) and store known road map information. The vehicle position estimation calculator 12a may perform map matching to match the acquired position coordinates (the latitude, the longitude, and the altitude) to the road map and thereby estimate the vehicle position (present position) on the road map.

Figure 5:
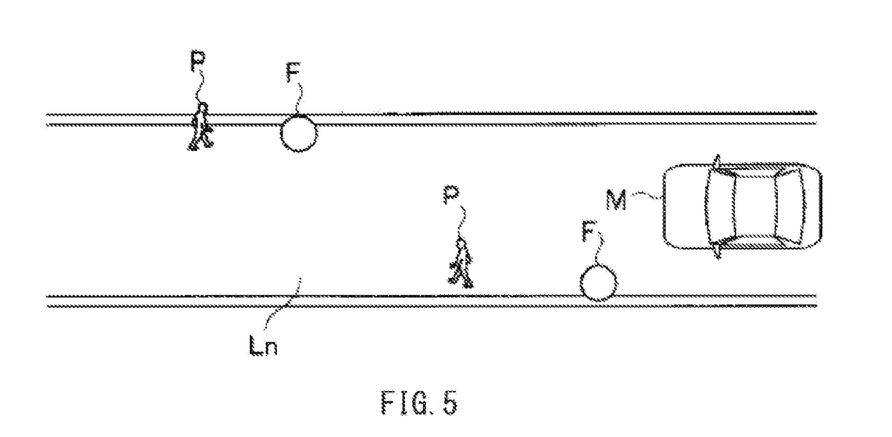
FIG. 5 is an explanatory diagram illustrating an example of a state in which a vehicle is traveling in a tense traveling environment.
Figure 6:
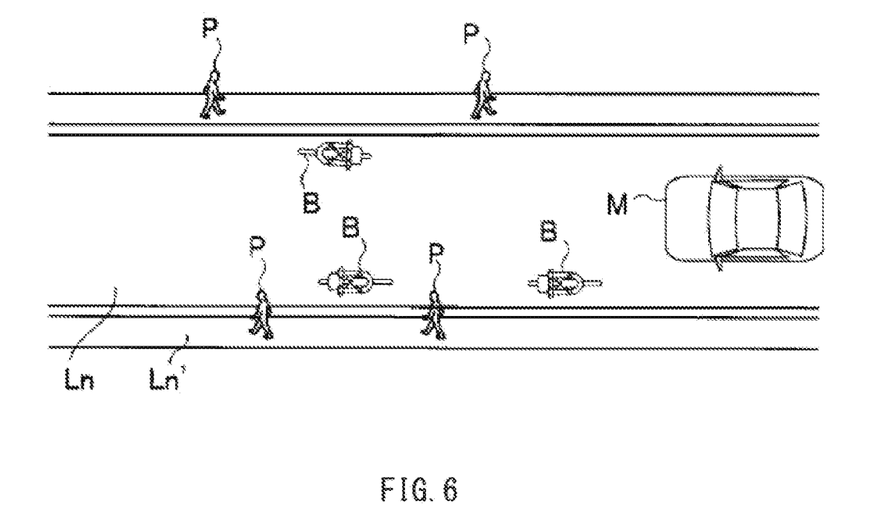
FIG. 6 is an explanatory diagram illustrating an example of a state in which the vehicle is traveling in a tenser traveling environment.

The road map information may include information indicating road situations. Examples of such information may include: a type of the road such as an urban region (e.g., a narrow street), an ordinary road, an arterial road, or a highway; a shape of the road; a direction of the road; a lane width; and an intersection such as a crossroad or a T-intersection. As used herein, the term "narrow street" may refer to a narrow road having a width less than a predetermined width (e.g., 4 m) in the urban region as illustrated in FIG. 5. The symbol F in FIG. 5 denotes a columnar object such as a utility pole standing on a roadside of a narrow street Ln. As illustrated in FIG. 6, roadside strips Ln' may be provided on respective sides of the narrow street Ln in some cases. A bicycle B is allowed to run on the roadside strip Ln'; however, in a case where a pedestrian P is walking on the roadside strip Ln' as illustrated in FIG. 6, the bicycle B is to run on the narrow street Ln.

The camera unit 21 may be fixed at an upper-middle position of a front part in a vehicle compartment of the vehicle M. The camera unit 21 may include an in-vehicle camera (a stereo camera), an image processing unit (IPU) 21c, and a surrounding traveling environment recognizing unit 21d. The in-vehicle camera may include a main camera 21a and a subsidiary camera 21b that are disposed at respective positions symmetrical in the left-right direction about the middle in a vehicle width direction (i.e., at the middle of the vehicle width). In one embodiment, the surrounding traveling environment recognizing unit 21d may serve as a "surrounding traveling environment information recognizing unit". The camera unit 21 may perform imaging of reference image data with use of the main camera 21a, and perform imaging of comparative image data with use of the subsidiary camera 21b.

The IPU 21c may perform a predetermined image process on both the reference image data and the comparative image data. The surrounding traveling environment recognizing unit 21d may read the reference image data and the comparative image data subjected to the image process by the IPU 21c, and recognize the identical object in the two pieces of image data on the basis of parallax therebetween. The surrounding traveling environment recognizing unit 21d may also calculate distance data (i.e., a distance from the vehicle M to the object) using the triangulation principle to recognize surrounding traveling environment information.

The surrounding traveling environment information may include, without limitation: a lane line that divides a road on which the vehicle M travels into left and right sections; a width (a lane width) between the left and the right lane lines; and a front obstacle. Examples of the front obstacle may include the pedestrian P, the bicycle B, and the columnar object F such as a utility pole, as illustrated in FIG. 6. The surrounding traveling environment recognizing unit 21d may recognize the above-described information by a method such as known pattern matching.

The traveling control unit 31 may read the surrounding traveling environment information. Coupled to an input side of the traveling control unit 31 may be the surrounding traveling environment recognizing unit 21d of the camera unit 21 and the map location calculator 12. In addition, devices including, without limitation, an accelerator-position sensor 32 and a vehicle-speed sensor 33 may be also coupled to the input side of the traveling control unit 31. The accelerator-position sensor 32 may detect an amount by which the accelerator pedal is pushed as an accelerator position. The vehicle-speed sensor 33 may be included in the autonomous sensor 14 described above, and detect a vehicle speed Vs of the vehicle M.

Coupled to an output side of the traveling control unit 31 may be a brake driving unit 34, a throttle driving unit 35, and a notification unit 36. The brake driving unit 34 may perform deceleration of the vehicle M by forced braking in order to avoid contact with another object. The throttle driving unit 35 may limit, on an as-needed basis, output of an engine 41 serving as the driving source with respect to the amount of operation performed on the accelerator pedal by the driver. The notification unit 36 may include devices including, without limitation, a monitor and a speaker that notify the driver of information calling for attention. The traveling control unit 31 may cause the brake driving unit 34 to operate to thereby perform braking of each of the four wheels individually. The driving source is not limited to the engine 41, and may be an electric motor, or may be a hybrid of the engine 41 and the electric motor.

The traveling control unit 31 may have a known autonomous emergency braking (AEB) function. Therefore, in a case where the traveling control unit 31 determines that the vehicle M is close to the front obstacle and interference between the vehicle M and the front obstacle is difficult to avoid, the AEB of the traveling control unit 31 may be activated to avoid the interference. However, acceleration is a normal driving state in a case where the surrounding traveling environment recognizing unit 21d has detected no front obstacle or in a case where the forward obstacle is determined to be relatively far away. Accordingly, even if the driver mistakenly pushes the accelerator pedal as the brake pedal, the traveling control unit 31 may determine the acceleration as normal driving.

In such a case, the driver who mistakenly pushes the accelerator pedal instead of the brake pedal is able to notice such a pushing mistake at once and release the accelerator pedal if the traveling environment is not in a tense situation. However, in a case where the driver mistakenly pushes the accelerator pedal instead of the brake pedal when the traveling environment is in a tense situation or in a case where such a pushing mistake makes the traveling environment to be in a tense situation, there is a possibility that the driver does not notice the pushing mistake and keeps pushing the accelerator pedal.

To address this, according to the example embodiment, a tense situation of the traveling environment may be predicated, and sudden acceleration resulting from pushing the accelerator pedal may be suppressed in a case where the traveling environment is in a tense situation. An acceleration suppression control to be executed by the traveling control unit 31 described above may be executed, for example, through an acceleration suppression control routine illustrated in FIG. 2.

Figure 2:
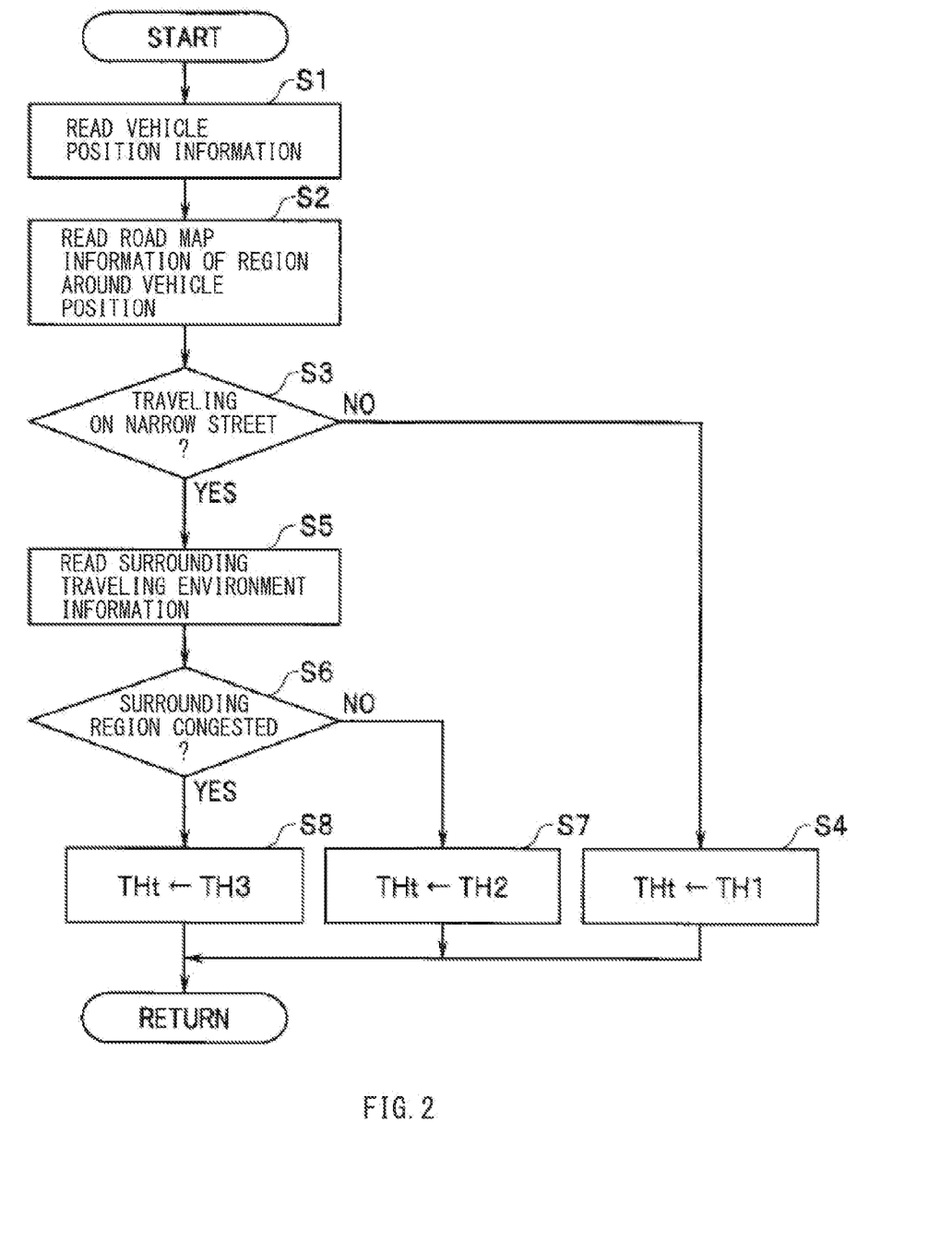
FIG. 2 is a flowchart illustrating an example of an acceleration suppression control routine.

In the acceleration suppression control routine illustrated in FIG. 2, first, in step S1, the traveling control unit 31 may read the vehicle position information estimated by the vehicle position estimation calculator 12a of the map location calculator 12. Thereafter, the process may be caused to proceed to step S2. In step S2, the traveling control unit 31 may refer to the road map information in the road map database 15 on the basis of the read vehicle position information, to thereby read the road map information (static traveling environment information) of the vehicle position and the road map information (static traveling environment information) of a region around the vehicle position. Thereafter, the process may be caused to proceed to step S3. In step S3, the traveling control unit 31 may check whether a road at the present vehicle position and a road in front of the present vehicle position are each a narrow street in the urban region. In one embodiment, the process in step S3 may serve as a process performed by the urban-region traveling determination unit.

In a case where it is determined that the vehicle M is traveling on a road other than the narrow street (NO in step S3), the process may be branched to step S4. In a case where it is determined that the vehicle M is traveling on the narrow street or is entering the narrow street (YES in step S3), the process may be caused to proceed to step S5. In step S4, the traveling control unit 31 may select a first throttle-angle table characteristic TH1 as a throttle-angle table THt (THt←TH1) and exit the routine. Note that the vehicle position information may be recognized on the basis of the surrounding traveling environment information acquired by the surrounding traveling environment recognizing unit 21d of the camera unit 21. Accordingly, in one embodiment, the process in step S2 may serve as a process performed by the traveling environment information acquisition unit.

The narrow street may be a narrow road having a width less than a predetermined width in the urban region, and examples thereof may include a community road. As illustrated in FIG. 5, the columnar objects F such as utility poles may stand on both sides of the narrow street Ln in some cases. Therefore, traveling on the narrow street Ln may require careful driving for avoiding interference with other objects. As illustrated in FIG. 6, the narrow street Ln may have a roadside strip (a sidewalk without a level difference set at the side of the road) Ln' in some cases.

In step S5, the traveling control unit 31 may read the surrounding traveling environment information acquired by the camera unit 21. Thereafter, in step S6, the traveling control unit 31 may check whether a road in front of the vehicle M is congested on the basis of the surrounding traveling environment information read in step S5. In a case where the narrow street Ln is congested with passage of moving bodies such as the bicycles B or the pedestrians P, it may be difficult for the vehicle M to pass the moving bodies because of the small road width of the narrow street Ln. Further, as illustrated in FIG. 5, in a case where the narrow street Ln has no roadside strip Ln', the pedestrian P may walk on the narrow street Ln. The traveling control unit 31 may check whether the road in front of the vehicle M is congested on the basis of whether the traveling of the vehicle M is obstructed by the moving object moving ahead. For example, the traveling control unit 31 may determine that the road in front of the vehicle M is congested in a case where the traveling of the vehicle M is obstructed by the moving object such as the bicycle B or the pedestrian P as illustrated in FIG. 6.

In a case where it is determined that the road in front of the vehicle M is not congested (NO in step S6), the process may be branched to step S7. In step S7, the traveling control unit 31 may select a second throttle-angle table characteristic TH2 as the throttle-angle table THt (THt←TH2), and exit the routine. Ina case where it is determined that the road in front of the vehicle M is congested (YES in step S6), the process may be caused to proceed to step S8. In step S8, the traveling control unit 31 may select a third throttle-angle table characteristic TH3 as the throttle-angle table THt (THt←TH3), and exit the routine. In one embodiment, the processes insteps S7 and S8 may serve as a process performed by the output suppression control processor.

Figure 4:
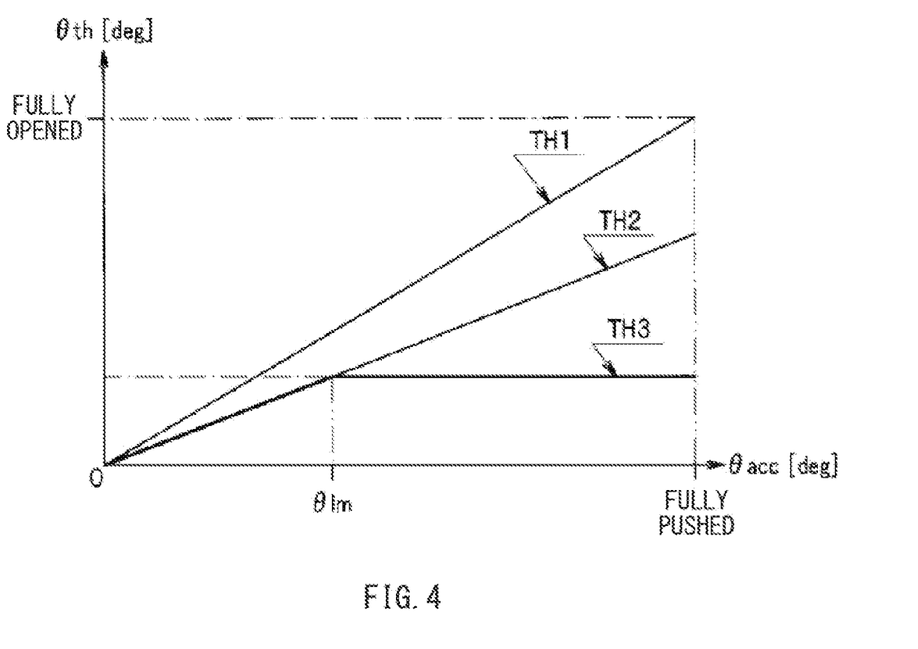
FIG. 4 is a conceptual diagram illustrating an example of a throttle-angle table.

FIG. 4 illustrates the concepts of the respective throttle-angle table characteristics TH1 to TH3. The first throttle-angle table characteristic TH1 may be read in a case of normal driving. The first throttle-angle table characteristic TH1 may have a slope at which the releasing of the accelerator pedal (0 degrees) to the fully pushing of the accelerator pedal substantially corresponds to the fully closing of the throttle (0 degrees) to the fully opening of the throttle. In the first throttle-angle table characteristic TH1, the throttle angle θth (degrees) proportional to the accelerator position θacc (degrees) detected by the accelerator-position sensor 32 may be set.

The second throttle-angle table characteristic TH2 may have a slope that is smaller than that of the first throttle-angle table characteristic TH1 described above, for example, a slope of 70% to 50% of that of the normal driving. Accordingly, the second throttle-angle table characteristic TH2 may be set to a characteristic that suppresses acceleration of the engine 41 and in which the throttle position is not at the fully opened position when the accelerator pedal is at the fully opened position. The third throttle-angle table characteristic TH3 may have a characteristic that is the same as that of the second throttle-angle table characteristic TH2 up to a predetermined accelerator position θlm and has a fixed throttle angle θth in a range where the accelerator position θacc exceeds the predetermined accelerator position θlm.

Therefore, in a case where the throttle-angle table THt is set to the third throttle-angle table characteristic TH3, even if the driver pushes the accelerator pedal, the upper limit of the throttle angle θth may be fixed and limited when the accelerator position θacc exceeds the accelerator position θlm. This may cause the acceleration to be substantially 0 (zero), causing the vehicle speed Vs to be substantially constant.

In the example embodiment, the accelerator position θlm may be set to a value that causes the vehicle speed Vs to be approximately 30 Km/h; however, this is non-limiting. Accordingly, in a case where the second throttle-angle table characteristic TH2 or the third throttle-angle table characteristic TH3 is selected as the throttle-angle table THt, the acceleration suppression control suppressing acceleration may be executed.

Figure 3:
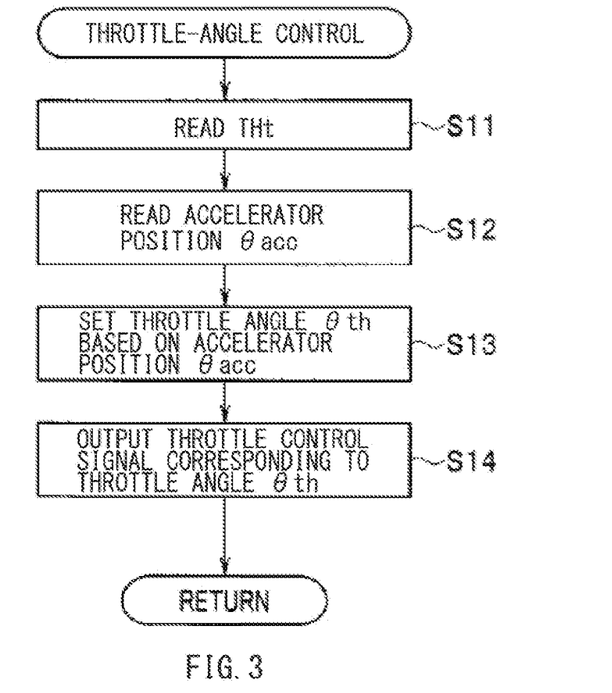
FIG. 3 is a flowchart illustrating an example of a throttle-angle control routine.

The throttle-angle table THt may be read in a throttle-angle control routine illustrated in FIG. 3 which is to be executed by the traveling control unit 31. In one embodiment, the process illustrated in FIG. 3 may serve as a process performed by the output setting unit.

In the throttle-angle control routine illustrated in FIG. 3, first, in step S11, the traveling control unit 31 may read the throttle-angle table THt selected in the acceleration suppression control routine.

Thereafter, the process may be caused to proceed to step S12. In step S12, the traveling control unit 31 may read the accelerator position θacc detected by the accelerator-position sensor 32. Thereafter, in step S13, the traveling control unit 31 may refer to the throttle-angle table THt to set the throttle angle θth based on the accelerator position θacc. Thereafter, the process may be caused to proceed to step S14.

In step S14, the traveling control unit 31 may output a throttle control signal corresponding to the set throttle angle θth to the throttle driving unit 35. Thereafter, the traveling control unit 31 may exit the routine. Thus, the throttle driving unit 35 may drive a throttle actuator of the engine 41 with a throttle angle signal corresponding to the throttle control signal to thereby cause the vehicle M to travel. Note that, in a case where the driving source is an electric motor, the vertical axis in FIG. 4 may represent motor output, and the fully opened state of the throttle may be read as the maximum motor output. Further, in step S14, the traveling control unit 31 may output a control signal corresponding to the motor output to a drive actuator of the electric motor.

As a result, in a case where the vehicle M travels on the narrow street Ln, on which a tense situation easily occurs, as illustrated in FIG. 5, the throttle angle θth may be set on the basis of the second throttle-angle table characteristic TH2 with the suppressed acceleration. Accordingly, even if the driver mistakenly pushes the accelerator pedal instead of the brake pedal while the vehicle M is traveling on the narrow street Ln, sudden acceleration is suppressed, making it possible to give the driver a sense of security.

In a case where the vehicle M travels on the congested narrow street Ln as illustrated in FIG. 6, the throttle angle θth may be set on the basis of the third throttle-angle table characteristic TH3. Accordingly, even if the driver mistakenly pushes the accelerator pedal a lot instead of the brake pedal, the throttle angle θth becomes substantially constant and the acceleration becomes substantially 0 (zero) when the accelerator position θacc reaches the accelerator position θlm. This may reduce a tense feeling of the driver, making it possible to secure time to make a decision such as a decision to release the accelerator pedal once.

Moreover, the traveling environment for suppressing acceleration may be limited to the narrow street Ln on which a tense situation easily occurs. Therefore, acceleration is not limited in traveling environments other than that involves a narrow street. Accordingly, for example, in a traveling environment where the driver wants to perform acceleration and intentionally pushes the accelerator pedal, favorable acceleration may be achieved. This gives no or less sense of strangeness to the driver.

Note that the embodiment of the technology is not limited to the example embodiment described above. In one example embodiment, the second throttle-angle table characteristic TH2 may be selected in place of the third throttle-angle table characteristic TH3, and the vehicle speed Vs may be controlled to be constant in a case where the vehicle speed Vs detected by the vehicle-speed sensor 33 exceeds a predetermined vehicle speed (e.g., 30 Km/h).

According to an embodiment of the technology, whether a vehicle is traveling in an urban region is checked on the basis of traveling environment information acquired by a traveling environment information acquisition unit. In a case where it is determined that the vehicle is traveling in the urban region, an output characteristic of a driving source is set to a suppression characteristic in which output of the driving source is suppressed with respect to an accelerator-pedal pushing amount. Further, the output of the driving source is set on the basis of the suppression characteristic. Accordingly, the traveling environment with the limitation of the output of the driving source is limited to traveling in the urban region in which the driver is easily involved in a tense situation. This makes it possible to suppress sudden acceleration resulting from mistakenly pushing the accelerator pedal instead of the brake pedal only in a traveling environment in which such suppression of acceleration is favorable.

As a result, in traveling environments other than that in the urban region, if the driver wants to perform acceleration and intentionally pushes the accelerator pedal, favorable acceleration is achievable. It is therefore possible to reduce a sense of strangeness given to the driver.

Each of the map location calculator 12, the surrounding traveling environment recognizing unit 21d, and the traveling control unit 31 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the map location calculator 12, the surrounding traveling environment recognizing unit 21d, and the traveling control unit 31 illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the map location calculator 12, the surrounding traveling environment recognizing unit 21d, and the traveling control unit 31 illustrated in FIG. 1.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle drive-assist apparatus comprising:
at least one processor; and
at least one machine readable non-transitory tangible medium storing instructions that, when executed by the at least one processor, cause the at least one processor to:
acquire traveling environment information that is information of an environment in which a vehicle travels, the traveling environment information including first information on a road map read from a database and second information on a position of the vehicle estimated based on a signal from a global navigation satellite system, wherein the first information provides information to classify roads into at least (1) urban narrow roads in an urban region with widths less than a predetermined width and (2) other roads excluding the urban narrow roads;
control an output amount of a driving source of the vehicle on a basis of an accelerator-pedal pushing amount that is an amount by which an accelerator pedal of the vehicle is pushed;
determine, based on the first information and the second information in the acquired traveling environment information, whether a road on which the vehicle is traveling is (1) an urban narrow road corresponding to one of the urban narrow roads or (2) another road corresponding to one of the other roads; and
recognize, based on the acquired traveling environment information, that the road is congested when determining that traveling of the vehicle is obstructed by a moving object ahead of the vehicle,
wherein the at least one processor is further configured to:
in response to determining that the vehicle is traveling on the another road, control the output amount of the driving source of the vehicle based on a first output characteristic so that the output amount increases at a first rate relative to an increase in the accelerator-pedal pushing amount;
in response to i) determining that the vehicle is traveling on the urban narrow road and ii) not recognizing that the road is congested, control the output amount based on a second output characteristic so that the output amount increases at a second rate less than the first rate relative to the increase in the accelerator-pedal pushing amount; and
in response to i) determining that the vehicle is traveling on the urban narrow road and ii) recognizing that the road is congested, (1) control the output amount based on the second output characteristic while the accelerator-pedal pushing amount is less than or equal to a predetermined amount or a speed of the vehicle is less than or equal to a predetermined speed, and (2) control the output amount based on a third output characteristic so that the output amount remains substantially constant even though the accelerator-pedal pushing amount increases while the accelerator-pedal pushing amount is greater than the predetermined amount or the speed of the vehicle is greater than the predetermined speed.

2. The vehicle drive-assist apparatus according to claim 1, further comprising a road map storage unit that stores the first information,
wherein the at least one processor is configured to estimate the position of the vehicle based on the signal from the global navigation satellite system, and
wherein the at least one processor is configured to acquire the traveling environment information of the vehicle from the first information stored in the road map storage unit based on the estimated position of the vehicle.

3. The vehicle drive-assist apparatus according to claim 1, wherein controlling the driving source based on the second output characteristic and the third output characteristic suppresses acceleration of the vehicle.

4. The vehicle drive-assist apparatus according to claim 2, wherein controlling the driving source based on the second output characteristic and the third output characteristic suppresses acceleration of the driving source.

5. The vehicle drive-assist apparatus according to claim 1, further comprising a throttle-angle table for controlling a throttle in response to the accelerator-pedal pushing amount, wherein the throttle-angle table includes:

the first characteristic that increases a throttle angle of the throttle as the accelerator-pedal pushing amount increases;

the second characteristic that less increases the throttle angle of the throttle as the accelerator-pedal pushing amount increases than the first characteristic; and the third characteristic that provides an upper limit of the throttle angle of the second characteristic so that the throttle angle remains constant when the throttle angle reaches the upper limit even though the accelerator-pedal pushing amount increases.

6. The vehicle drive-assist apparatus according to claim 1, wherein the output amount of the driving source of the vehicle is adjusted by a throttle opening degree of an engine of the vehicle.

7. A vehicle drive-assist apparatus comprising:

circuitry configured to:

acquire traveling environment information that is information of an environment in which a vehicle travels, the traveling environment information including first information on a road map read from a database and second information on a position of the vehicle estimated based on a signal from a global navigation satellite system, wherein the first information provides information to classify roads into at least (1) urban narrow roads in an urban region with widths less than a predetermined width and (2) other roads excluding the urban narrow roads;

control an output amount of a driving source of the vehicle on a basis of an accelerator-pedal pushing amount that is an amount by which an accelerator pedal of the vehicle is pushed;

determine, based on the first information and the second information in the acquired traveling environment information, whether a road on which the vehicle is traveling is (1) an urban narrow road corresponding to one of the urban narrow roads or (2) another road corresponding to one of the other roads; and recognize, based on the acquired traveling environment information, that the road is congested when determining that traveling of the vehicle is obstructed by a moving object ahead of the vehicle, wherein the circuitry is further configured to:

in response to determining that the vehicle is traveling on the another road, control the output amount of the driving source of the vehicle based on a first output characteristic so that the output amount increases at a first rate relative to an increase in the accelerator-pedal pushing amount;

in response to i) determining that the vehicle is traveling on the urban narrow road and ii) not recognizing that the road is congested, control the output amount based on a second output characteristic so that the output amount increases at a second rate less than the first rate relative to the increase in the accelerator-pedal pushing amount; and in response to i) determining that the vehicle is traveling on the urban narrow road and ii) recognizing that the rode is congested, (1) control the output amount based on the second output characteristic while the accelerator-pedal pushing amount is less than or equal to a predetermined amount or a speed of the vehicle is less than or equal to a predetermined speed, and (2) control the output amount based on a third output characteristic so that the output amount remains substantially constant even though the accelerator-pedal pushing amount increases while the accelerator-pedal pushing amount is greater than the predetermined amount or the speed of the vehicle is greater than the predetermined speed.

8. The vehicle drive-assist apparatus according to claim 7, further comprising a throttle-angle table for controlling a throttle in response to the accelerator-pedal pushing amount, wherein the throttle-angle table includes:

the first characteristic that increases a throttle angle of the throttle as the accelerator-pedal pushing amount increases;

the second characteristic that less increases the throttle angle of the throttle as the accelerator-pedal pushing amount increases than the first characteristic; and the third characteristic that provides an upper limit of the throttle angle of the second characteristic so that the throttle angle remains constant when the throttle angle reaches the upper limit even though the accelerator-pedal pushing amount increases.

9. The vehicle drive-assist apparatus according to claim 7, wherein the output amount of the driving source of the vehicle is adjusted by a throttle opening degree of an engine of the vehicle.

* * * * *